(12) United States Patent
Mammou et al.

(10) Patent No.: US 10,491,916 B2
(45) Date of Patent: Nov. 26, 2019

(54) EXPLOITING CAMERA DEPTH INFORMATION FOR VIDEO ENCODING

(71) Applicants: Advanced Micro Devices, Inc., Sunnyvale, CA (US); ATI Technologies ULC, Markham (CA)

(72) Inventors: Khaled Mammou, Thornhill (CA); Ihab Amer, Stouffville (CA); Gabor Sines, Thornhill (CA); Lei Zhang, Richmond Hill (CA); Michael Schmit, Cupertino, CA (US); Daniel Wong, Cupertino, CA (US)

(73) Assignees: ADVANCED MICRO DEVICES, INC., Sunnyvale, CA (US); ATI TECHNOLOGIES ULC, Markham (CA)

( * ) Notice: Subject to any disclaimer, the term of this patent is extended or adjusted under 35 U.S.C. 154(b) by 298 days.

(21) Appl. No.: 14/043,427

(22) Filed: Oct. 1, 2013

(65) Prior Publication Data
US 2015/0092856 A1 Apr. 2, 2015

(51) Int. Cl.
| | |
|---|---|
| *H04N 19/51* | (2014.01) |
| *H04N 19/56* | (2014.01) |
| *H04N 19/597* | (2014.01) |
| *H04N 19/52* | (2014.01) |
| *H04N 19/46* | (2014.01) |
| *H04N 19/513* | (2014.01) |

(52) U.S. Cl.
CPC .......... *H04N 19/51* (2014.11); *H04N 19/46* (2014.11); *H04N 19/52* (2014.11); *H04N 19/521* (2014.11); *H04N 19/56* (2014.11); *H04N 19/597* (2014.11)

(58) Field of Classification Search
CPC ......... H04N 19/00769; H04N 19/0066; H04N 19/00733; H04N 19/00696; H04N 19/597; H04N 19/56; H04N 19/521; H04N 19/51; H04N 19/46; H04N 19/52
USPC ................................................. 375/240.16
See application file for complete search history.

(56) References Cited

U.S. PATENT DOCUMENTS

| | | | |
|---|---|---|---|
| 9,132,352 B1* | 9/2015 | Rabin .................... A63F 13/30 |
| 2010/0104219 A1* | 4/2010 | Limonov ............ H04N 13/178 | 382/285 |
| 2010/0238264 A1* | 9/2010 | Liu ..................... H04N 13/0011 | 348/14.13 |
| 2011/0058016 A1* | 3/2011 | Hulyalkar .......... H04N 13/0029 | 348/42 |

(Continued)

*Primary Examiner* — Zaihan Jiang
(74) *Attorney, Agent, or Firm* — Volpe and Koenig, P.C.

(57) ABSTRACT

The present disclosure is directed a system and method for exploiting camera and depth information associated with rendered video frames, such as those rendered by a server operating as part of a cloud gaming service, to more efficiently encode the rendered video frames for transmission over a network. The method and system of the present disclosure can be used in a server operating in a cloud gaming service to improve, for example, the amount of latency, downstream bandwidth, and/or computational processing power associated with playing a video game over its service. The method and system of the present disclosure can be further used in other applications where camera and depth information of a rendered or captured video frame is available.

22 Claims, 6 Drawing Sheets

(56) References Cited

U.S. PATENT DOCUMENTS

| | | | | |
|---|---|---|---|---|
| 2011/0069760 A1* | 3/2011 | Lee | H04N 5/145 | 375/240.16 |
| 2011/0096832 A1* | 4/2011 | Zhang | G06T 7/579 | 375/240.08 |
| 2011/0141274 A1* | 6/2011 | Liao | H04N 7/181 | 348/139 |
| 2011/0149019 A1* | 6/2011 | Kellerman | G06T 3/4007 | 348/42 |
| 2012/0105602 A1* | 5/2012 | McNamer | G06T 7/20 | 348/50 |
| 2013/0114689 A1* | 5/2013 | Chang | H04N 19/597 | 375/240.03 |
| 2013/0128979 A1* | 5/2013 | Jones | H04N 19/00733 | 375/240.16 |
| 2013/0229485 A1* | 9/2013 | Rusanovskyy | H04N 13/0048 | 348/43 |
| 2013/0271565 A1* | 10/2013 | Chen | H04N 13/0048 | 348/43 |
| 2014/0092439 A1* | 4/2014 | Krig | G06T 9/001 | 358/2.1 |
| 2014/0104274 A1* | 4/2014 | Hilliges | G06F 3/011 | 345/424 |
| 2014/0114845 A1* | 4/2014 | Rogers | G06T 15/08 | 705/39 |
| 2014/0321561 A1* | 10/2014 | Stec | H04N 19/00545 | 375/240.29 |
| 2014/0340478 A1* | 11/2014 | Kwong | H04N 19/597 | 348/43 |
| 2014/0362930 A1* | 12/2014 | Brockmann | H04N 19/103 | 375/240.26 |
| 2015/0092856 A1* | 4/2015 | Mammou | H04N 19/597 | 375/240.16 |
| 2017/0105020 A1* | 4/2017 | Wajs | H04N 19/513 | |
| 2017/0199580 A1* | 7/2017 | Hilliges | G06F 3/017 | |

\* cited by examiner

EXPLOITING CAMERA DEPTH INFORMATION FOR VIDEO ENCODING

FIELD

This application relates generally to video encoding and, more specifically, to video encoding.

BACKGROUND

Cloud gaming is a relatively new cloud service where a user plays a video game that is remotely run on at least one server. The server renders frames of the video game and encodes the rendered frames for transmission over a network to an end user device of the user. The end user device is generally only required to send control inputs, such as those received from the user interacting with the video game, over the network to the server and to decode and display the rendered frames received from the server.

The advantages of cloud gaming include users not having to purchase end user devices capable of rendering complex video game scenes. Less sophisticated end user devices, including lightweight personal computers, set-top boxes, smartphones, and tablets, can be used to play video games run by a cloud service because the rendering is done by the remote server. Additionally, game developers do not have to develop or port their games to run on a large number of different platforms or even worry to a large extent about software piracy because their video game software does not have to leave the remote server it is run on.

However, cloud gaming is not without its challenges. In order to provide a quality experience to the user, cloud gaming typically requires a high-level of graphic quality to be provided to the user with low latency over some maximum amount of downstream bandwidth. Latency is a measure of delay and in cloud gaming can include the total time required to gather and transmit user inputs to the server, to render and encode the relevant frame at the server, to transmit the encoded frame to the end user device, and to decode and display the frame at the end user device. In the case of many games, such as first-person shooter games, a latency of less than 100 milliseconds (ms) per frame is generally desirable. It can be quite challenging to provide a high-level of graphic quality with such low latency over some maximum amount of downstream bandwidth without incurring substantial computational hardware costs at the server.

BRIEF DESCRIPTION OF THE DRAWINGS/FIGURES

The accompanying drawings, which are incorporated herein and form a part of the specification, illustrate the embodiments of the present disclosure and, together with the description, further serve to explain the principles of the embodiments and to enable a person skilled in the pertinent art to make and use the embodiments.

The embodiments of the present disclosure will be described with reference to the accompanying drawings. The drawing in which an element first appears is typically indicated by the leftmost digit(s) in the corresponding reference number.

DETAILED DESCRIPTION OF ONE OR MORE EMBODIMENTS

Figure 1:
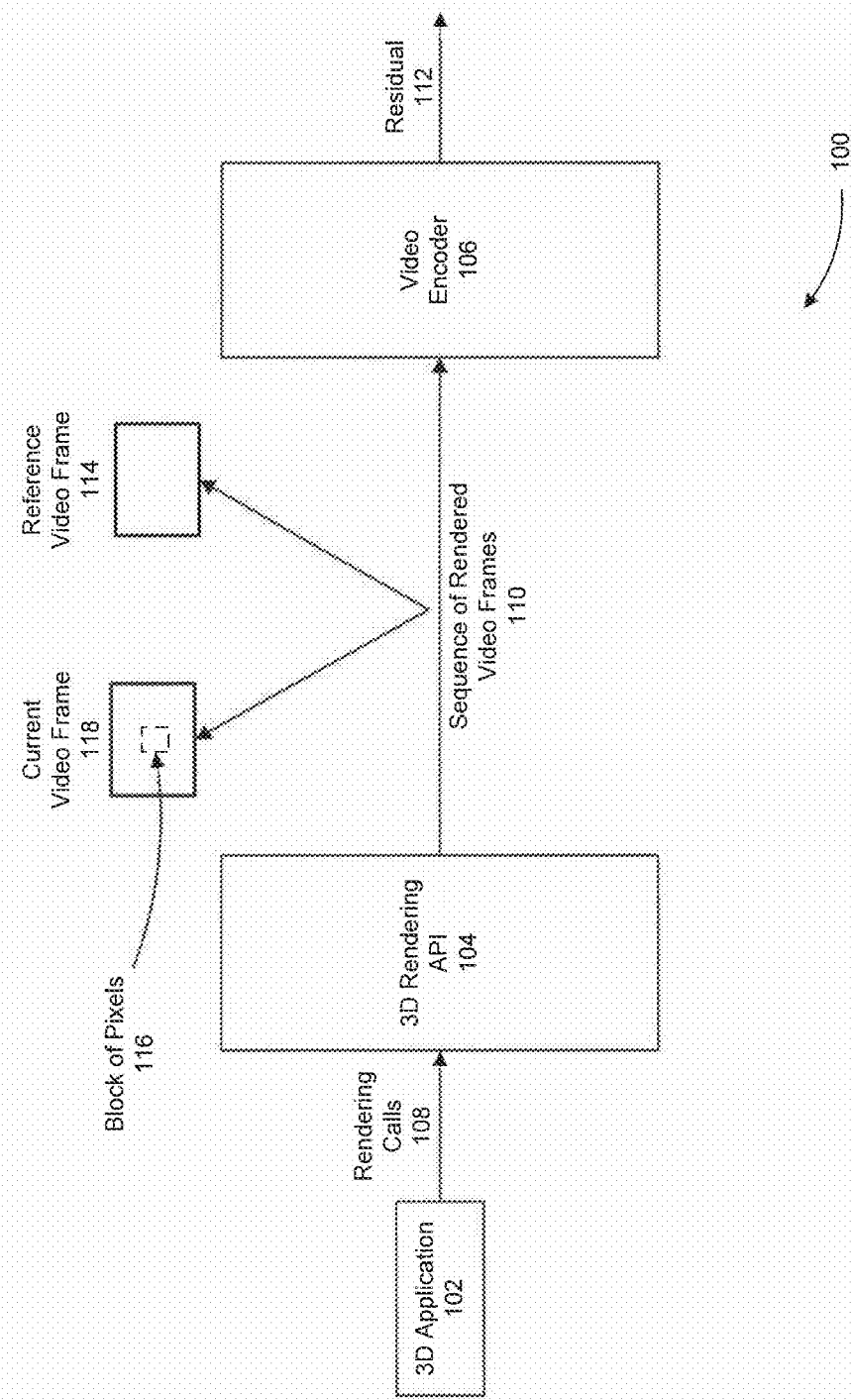
FIG. 1 illustrates a functional block diagram of a system in which embodiments of the present disclosure can be implemented

In the following description, numerous specific details are set forth in order to provide a thorough understanding of the embodiments of the present disclosure. However, it will be apparent to those skilled in the art that the embodiments, including structures, systems, and methods, may be practiced without these specific details. The description and representation herein are the common means used by those experienced or skilled in the art to most effectively convey the substance of their work to others skilled in the art. In other instances, well-known methods, procedures, components, and circuitry have not been described in detail to avoid unnecessarily obscuring aspects of the disclosure.

References in the specification to "one embodiment," "an embodiment," "an example embodiment," etc., indicate that the embodiment described may include 4 particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

1. OVERVIEW

The present disclosure is directed to embodiments related to a system and method for exploiting camera and depth information associated with rendered video frames, such as those rendered by a server operating as part of a cloud gaming service, to more efficiently encode the rendered video frames for transmission over a network. Before describing further details of the system and method, a brief overview of rendering and video encoding is provided.

In general, rendering is the process of obtaining a video frame by projecting a three-dimensional scene onto a two-dimensional plane that corresponds to a view observed by a virtual camera. Depth information relating to the distance of objects in the three-dimensional scene from the virtual camera is typically calculated during the rendering process to determine which objects in the three-dimensional scene should and should not be visible in the rendered video frame to a user. For example, certain objects in the three-dimensional scene should not be visible to the user because they lie behind other objects in the three-dimensional scene that are opaque. The calculated depth information can be used to determine whether an object is occluded by another object in the three-dimensional scene that is opaque and prevent the occluded object from being rendered in the video frame (or at least ensure that the occluded object is "overdrawn" by the object that occludes it during the rendering process).

After a sequence of video frames has been rendered, video encoding can be performed to decrease the amount of bits required to transmit the sequence of rendered video frames to a receiving device over a network by eliminating redundant image information. For example, closely adjacent video frames in a sequence of video frames are usually very similar and often only differ in that one or more objects in the scenes they depict move slightly between the sequential frames. Video encoding is configured to exploit this temporal redundancy between video frames in at least one instance by searching a reference video frame for a block of pixels that closely matches a block of pixels in a current video frame to be encoded.

Assuming the closely-matched block of pixels in the reference video frame was already transmitted to a receiving device, a video encoder exploits the fact that there is generally no need to send to the receiving device the content of the block of pixels in the current video frame that is redundant with the closely-matched block of pixels in the reference video frame. The video encoder instead forms a prediction of the block of pixels in the current video frame based on the closely-matched block of pixels in the reference video frame to determine the redundant information and then subtracts the prediction from the block of pixels in the current video frame, leaving only a residual. This process is often referred to as motion-compensation prediction. The residual (or information determined based on the residual) can then be sent to the receiving device without the redundant information to decrease the amount of bits needed to transmit the current video frame.

A video decoder at the receiving device can reconstruct the block of pixels in the current video frame based on the residual because the redundant information can be predicted based on the closely-matched block of pixels in the reference video frame available at the receiving device using, for example, the same prediction method performed by the video encoder.

In one embodiment, the system and method of the present disclosure exploit virtual camera and depth information associated with a sequence of rendered video frames to improve the motion-compensation prediction process performed by a video encoder to encode the sequence of rendered video frames. Motion-compensation prediction, as described above, includes searching for a block of pixels in a reference video frame that closely matches a block of pixels in a current video frame to be encoded. Improving this searching process can reduce the amount of time and/or bits used to encode the block of pixels in the current video frame.

In another embodiment, the system and method of the present disclosure exploit virtual camera and depth information associated with a sequence of rendered video frames to adapt a rate control algorithm performed by a video encoder to encode the sequence of rendered video frames. The rate control algorithm is performed by the video encoder to determine the number of bits to use to quantize a residual of an encoded block of pixels prior to transmitting it to a receiving device. The system and method specifically exploit the virtual camera and depth information to adapt the rate control algorithm such that the residual is quantized using a larger number of bits if its image content depicts an object (or objects) closer to the virtual camera and a smaller number of bits if its image content depicts an object (or objects) comparatively farther away from the virtual camera. In general, the image qualities of objects closer to the virtual camera are perceptually more important to a user than the image qualities of objects farther away from the virtual camera. Thus, allocating bits to residuals based on the proximity of the object(s) they depict to the virtual camera can reduce the number of bits used to encode a sequence of video frames and/or improve the perceptual quality of the encoded sequence of video frames to a user.

The embodiments of the system and method of the present disclosure described above can be used in a server operating in a cloud gaming service to improve, for example, the amount of latency, downstream bandwidth, and/or computational processing power associated with playing a video game over its service. The method and system of the present disclosure can be further used in other applications where camera and depth information of a rendered or captured video frame is available as would be appreciated by one of ordinary skill in the art based on the teachings herein. For example, the method and system of the present disclosure can be used in a video conferencing application that uses a depth camera to capture video frames.

These and other features of the present disclosure, as well as the structure and operation of various embodiments, are described in further detail below with reference to the accompanying drawings.

2. EXAMPLE OPERATING ENVIRONMENT

FIG. 1 illustrates a functional block diagram 100 of an example operating environment in which embodiments of the present disclosure can be implemented. Block diagram 100 includes a three-dimensional application 102, a three-dimensional rendering application programming interface (API) 104, and a video encoder 106.

Three-dimensional application 102 is an end-user application, such as a video game, a computer aided design application, a computer aided manufacturing application, or the like, that produces three-dimensional scenes for rendering and display.

Three-dimensional rendering API 104 is an intermediary between three-dimensional application 102 and the graphics hardware (not shown) on which the scenes produced by three-dimensional application 102 are rendered. With new graphics hardware technologies appearing at a fast rate, it is difficult for application developers to take into account, and take advantage of, the latest hardware features. It is also difficult for application developers to write applications specifically for each foreseeable set of graphics hardware. Three-dimensional rendering API 104 prevents three-dimensional application 102 from having to be too hardware-specific. Three-dimensional application 102 can output three-dimensional graphics data and commands, labeled as rendering calls 108 in FIG. 1, to three-dimensional rendering API 104 in a standardized format, rather than directly to the graphics hardware. Three-dimensional API 104 can communicate with and control the graphics hardware based on rendering calls 108 to render a sequence of video frames 110 depicting two-dimensional representations of the three-dimensional scenes produced by three-dimensional application 102. Three-dimensional rendering API 104 can include a commercially available API (such as DirectX® or OpenGL®), a custom API, or the like.

Once rendered, the sequence of rendered video frames 110 can be provided to video encoder 106 for encoding to decrease the amount of bits required to transmit the sequence of rendered video frames 110 to a receiving device over a network. In general, video encoder 106 decreases the amount of bits required to transmit the sequence of rendered video frames 110 to a receiving device over a network by eliminating redundant image information. For example, closely adjacent video frames in the sequence of rendered video frames 110, are usually very similar and often only differ in that one or more objects in the scenes they depict move slightly between them.

Video encoder 106 is configured to exploit this temporal redundancy between video frames in at least one instance by searching a reference video frame 114 in the sequence for a block of pixels that closely matches a block of pixels 116 in a current video frame 118 to be encoded. Current video frame 118 and reference video frame 116 can be consecutive video frames in sequence of rendered video frames 110 or can be spaced farther apart in time. Assuming the closely-matched block of pixels in reference video frame 114 was already transmitted to the receiving device, video encoder 106 exploits the fact that there is generally no need to send to the receiving device the content of block of pixels 116 in current video frame 118 that is redundant with the closely-matched block of pixels in reference video frame 114. Video encoder 106 instead forms a prediction of block of pixels 116 based on the closely-matched block of pixels in reference video frame 114 to determine the redundant information and then subtracts the prediction from the block of pixels 116, leaving only a residual 112. This process is referred to as motion-compensation prediction. Residual 112 (or information determined based on residual 112) can then be sent to the receiving device without the redundant information to decrease the amount of bits needed to transmit current video frame 118.

Figure 2:
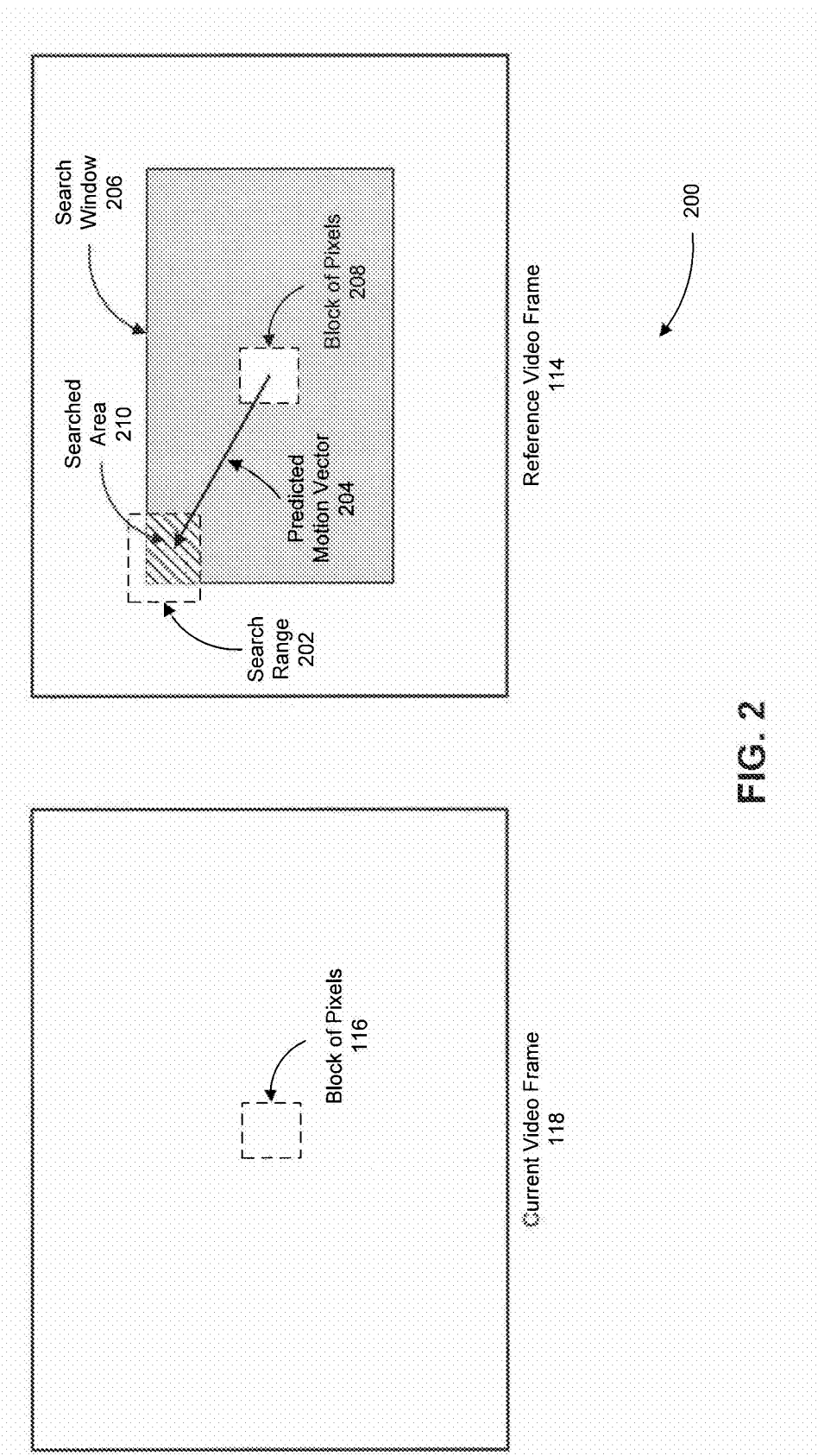
FIG. 2 illustrates a motion-compensation prediction process typically employed by video encoders to encode a current video frame using a reference video frame.

FIG. 2 illustrates further details of the motion-compensation prediction process 200 employed by video encoder 106 to encode block of pixels 116. As described above, the motion-compensation prediction process includes searching for a block of pixels in reference video frame 114 that closely matches block of pixels 116 in current video frame 118 to be encoded. Because searching the entire reference video frame 114 is prohibitively expensive in terms of computational complexity, practical implementations of software and hardware video encoders search a selected area of reference video frame 114, referred to as a search range 202. Search range 202 lies within reference vide frame 114 around a predicted motion vector 204 that is computed based on previously encoded blocks of pixels.

In many instances, especially in hardware encoder implementations, the video encoder is not equipped with enough memory to store the entire reference video frame 114. Hence, a subset of reference video frame 114, referred to as a search window 206, is stored, and predicted motion vector 204 is restricted to stay inside search window 206. Search window 206 is typically centered on a block of pixels 208 in reference video frame 202 that is located at the same relative position as block of pixels 116 in current video frame 118. As is shown in FIG. 2, part of search range 202 may be outside search window 206. In such an instance, the actual searched area 210 is the overlapping region between search window 206 and search range 202.

In general, the smaller search window 206 is made, the smaller the required memory footprint and the lower the cost of implementing video encoder 106 shown in FIG. 1. However, for video frames depicting relatively fast-motion scenes or when a frame with a large temporal distance from the frame to be encoded is used as a reference frame, restricting the size of search window 206 too much may lead to the failure of the motion-compensation prediction process to efficiently capture the motion between video frames. This is because objects depicted by block of pixels 116 will likely have moved outside search window 206. In practice, this can result in encoding block of pixels 116 as an intra-predicted block or as an inter-predicted block with high-energy residuals. In either case, the number of bits used to encode block of pixels 116 will typically need to increase in order to maintain the same level of encoded image quality had search window 206 been large enough to better capture the motion between video frames. As will be described in the following section, embodiments of the system and method of the present disclosure can help to alleviate this tradeoff between the size of search window 212 and the number bits required to encode block of pixels 204 by exploiting virtual camera and depth information associated with reference video frame 114 and current video frame 118.

3. SYSTEM AND METHOD FOR EXPLOITING VIRTUAL CAMERA AND DEPTH INFORMATION

Figure 3:
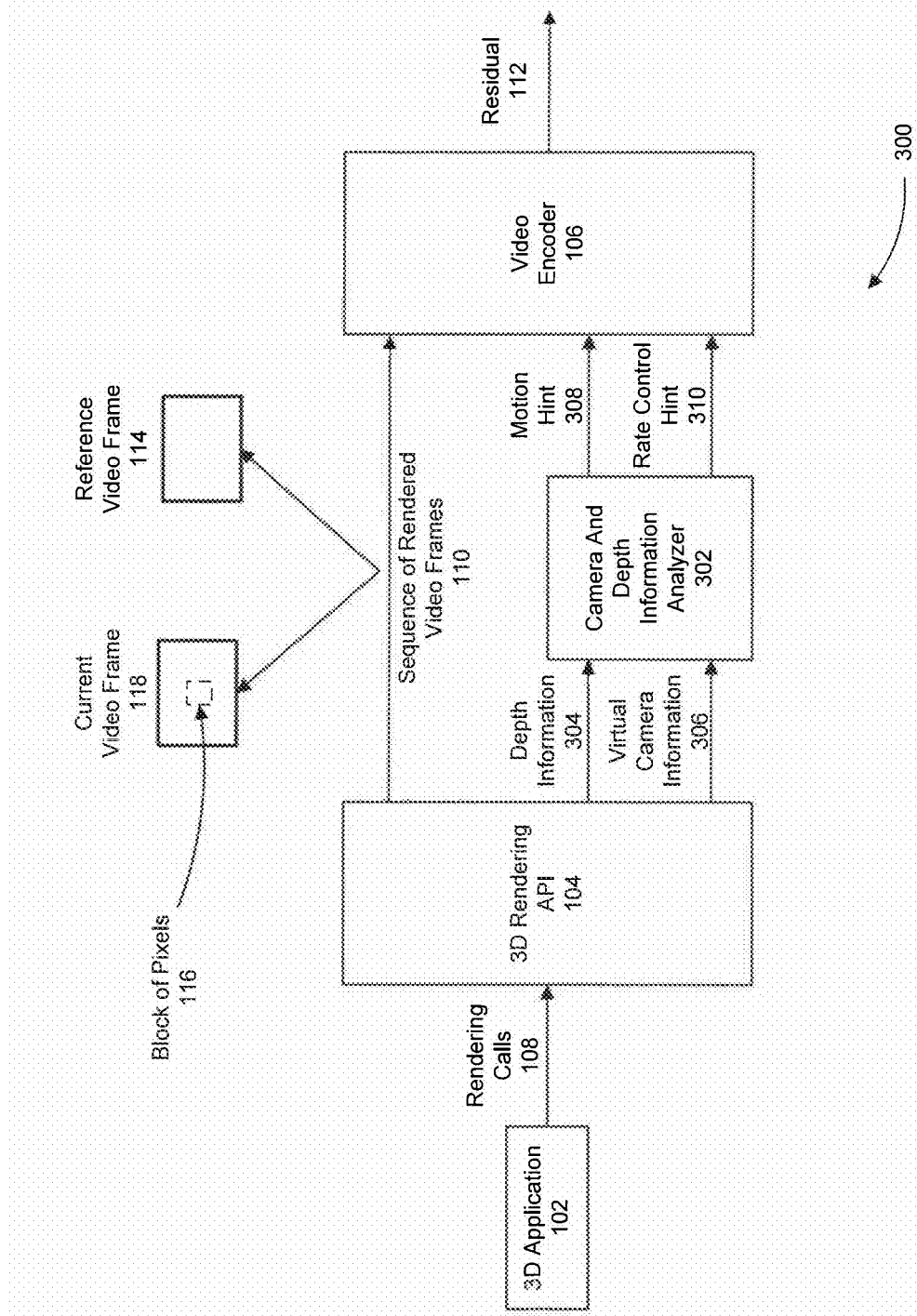
FIG. 3 illustrates a functional block diagram of a system for exploiting camera and depth information associated with rendered video frames to more efficiently encode the rendered video frames for transmission over a network in accordance with embodiments of the present disclosure.

FIG. 3 illustrates a functional block diagram 300 that is substantially similar to functional block diagram 100 in FIG. 1, with the exception that a camera and depth information analyzer 302 has been added and some modifications to existing blocks have been made. In particular, three-dimensional rendering API 104 has been modified, in at least one embodiment, to provide the depth information 304 and virtual camera information 306 associated with sequence of rendered video frames 110 as output.

In operation, camera and depth information analyzer 302 is configured to process depth information 304 and virtual camera information 306 to provide a motion hint 308 to guide the motion-compensation prediction process performed by video encoder 106. In one embodiment, motion hint 308 is a predicted motion field that includes a number of different motion vectors. The motion vectors are associated with different image regions in current video frame 118 and predict the motion of the particular image region they are associated with from reference video frame 114.

The predicted motion field can be used by video encoder 106 to more efficiently encode block of pixels 116 in current video frame 118. For example, the motion field provided by camera and depth information analyzer 302 can be referenced to find the motion vector associated with the particular image region of current video frame 118 in which block of pixels 116 lies within. This motion vector can then be used to better position search window 206 in reference video frame 114, as shown in FIG. 2, to better capture the motion of block of pixels 116 from reference video frame 114. Because search window 206 is better positioned to capture the motion of block of pixels 116 from reference video frame 114, it can be made smaller without increasing the number of bits needed to encode block of pixels 116 to maintain the level of encoded image quality at a particular level.

In another embodiment, camera and depth information analyzer 302 is configured to process virtual camera information 306 and depth information 304 to adapt a rate control algorithm performed by video encoder 106 to encode sequence of rendered video frames 110. The rate control algorithm is performed by video encoder 106 to determine the number of bits to use to quantize a residual, such as residual 112, of an encoded block of pixels prior to transmitting it to a receiving device. Camera and depth information analyzer 302 specifically exploits the depth information 304 and the virtual camera information 306 to adapt the rate control algorithm such that the residual is quantized using a larger number of bits if its image content depicts an object (or objects) closer to the virtual camera and a smaller number of bits if its image content depicts an object (or objects) comparatively farther away from the virtual camera. The closeness of the object (or objects) depicted by the image content of a residual can be determined, for example, based on the average or the median depth value of the pixels in the block of pixels associated with the residual.

In general, the image qualities of objects closer to the virtual camera are perceptually more important to a user than the image qualities of objects farther away from the virtual camera. Thus, allocating bits to residuals based on the proximity of the object(s) they depict to the virtual camera can reduce the number of bits used to encode a sequence of video frames and/or improve the perceptual quality of the encoded sequence of video frames to a user.

As a consequence of the foregoing, certain benefits may be obtained or manifested in various circumstances. For example, as a consequence of the hints described above, a cloud or other remote server employing aspects of embodiments described herein may encode frames more quickly and/or with reduced processing and/or power requirements. Additionally, frames so rendered may appear to a user of an end-user device to be have a perceived higher quality or, alternatively, equal quality of prior art techniques but with reduced latency. Accordingly, a system encompassing such a cloud or other remote server and one more end-user devices may operate with greater efficiency.

Figure 4:
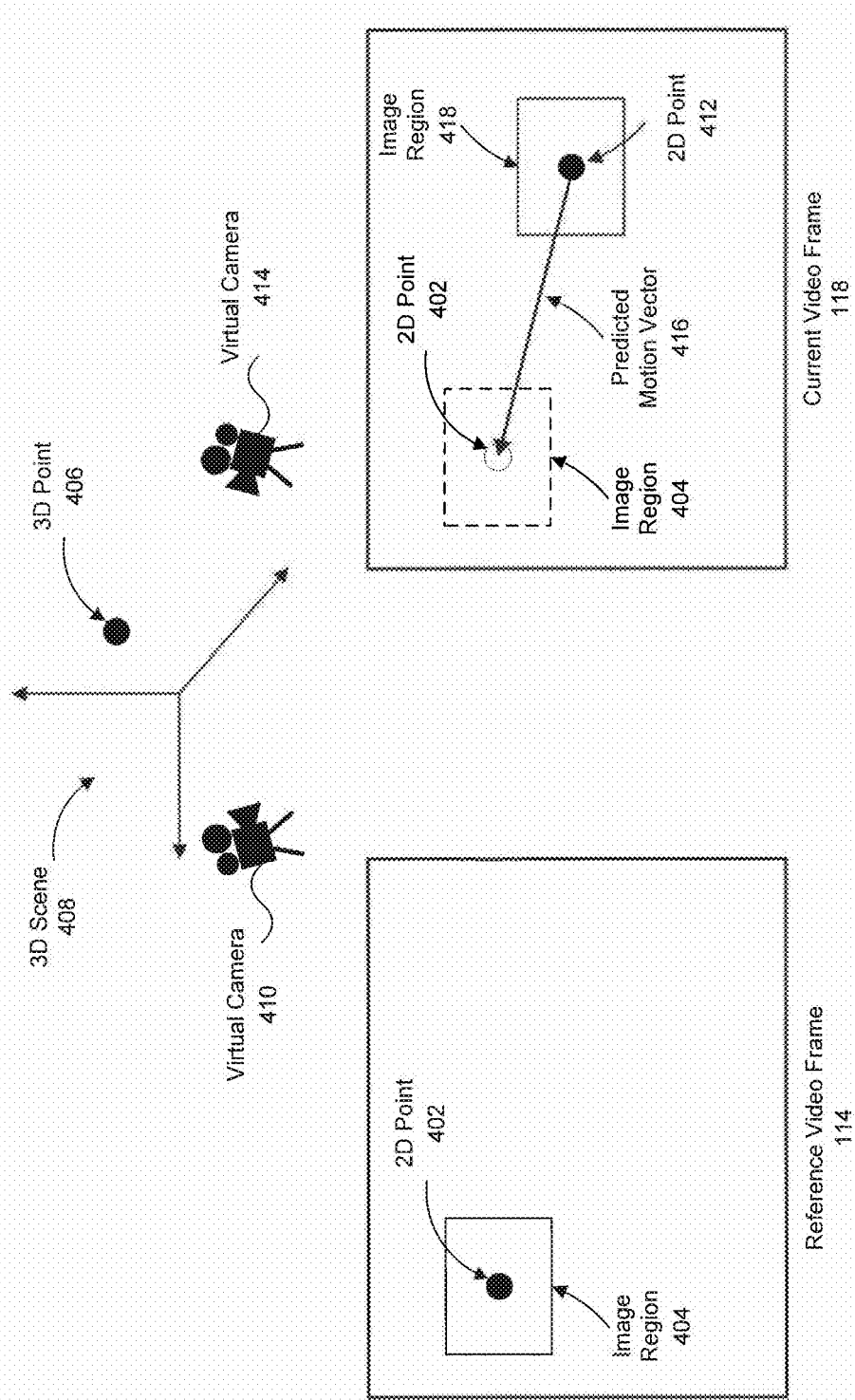
FIG. 4 illustrates the generation of a motion vector for guiding a motion-compensation prediction process performed by a video encoder in accordance with embodiments of the present disclosure.

Referring now to FIG. 4, further details of the operation of camera and depth information analyzer 302 in generating a motion vector for an image region in current video frame 118 from reference video frame 114 is illustrated in accordance with embodiments of the present disclosure.

Initially, camera and depth information analyzer 302 selects an image region 404 in reference video frame 114. Camera and depth information analyzer then associates a depth value and a two-dimensional point 402 (i.e., a pixel) with image region 404. In one embodiment, two-dimensional point 402 is selected as the barycenter of image region 404 and the depth value is set as the average depth value of the two-dimensional points (i.e., pixels) in image region 404. In one embodiment, the depth values of the two-dimensional points in image region 404 correspond to the distance of the objects they depict in three-dimensional scene 408 from a virtual camera 410 used to render them and are provided to camera and depth information analyzer 302 from three-dimensional rendering API 104 as part of depth information 304.

Next, camera and depth information analyzer 302 maps two-dimensional point 402 back to a three-dimensional point 406 in three-dimensional scene 408. As would be appreciated by one of ordinary skill in the art, the mapping of two-dimensional point 402 to three-dimensional point 406 is essential a reverse rendering process and can be performed using the position of two-dimensional point 402 in reference video frame 114, its associated depth value, and the position and orientation of virtual camera 414 used to render reference video frame 114. The position and orientation of virtual camera 410 are provided to camera and depth information analyzer 302 from three-dimensional rendering API 104 as part of virtual camera information 306.

After determining three-dimensional point 406, camera and depth information analyzer 302 can map three-dimensional point 406 to a two-dimensional point 412 (i.e., a pixel) in current video frame 118 by rendering three-dimensional point 406 based on the position and orientation of a virtual camera 414 used to render current video frame 118. The position and orientation of virtual camera 414 is similarly provided to camera and depth information analyzer 302 from three-dimensional rendering API 104 as part of virtual camera information 306.

Thereafter, camera and depth information analyzer 302 can determine a motion vector 416 based on a difference in position of two-dimensional point 402 and two-dimensional point 412.

Finally, camera and depth information analyzer 302 can provide motion vector 416 (or some information determined based off of motion vector 416) to video encoder 106 as part of motion hint 308. As described above, video encoder 106 can use motion vector 416 to position a search window in reference video frame 114 while performing motion-compensation prediction to more efficiently encode a block of pixels in image region 418 of current video frame 118.

It should be further noted that video encoder 106 can further use the depth value associated with two-dimensional point 402 to determine a size of the search window in reference video frame 114 while performing motion-compensation prediction, or a size of the search range to use within the search window. For example, for smaller depth values, the search window size and/or the size of the search range can be made larger.

Figure 5:
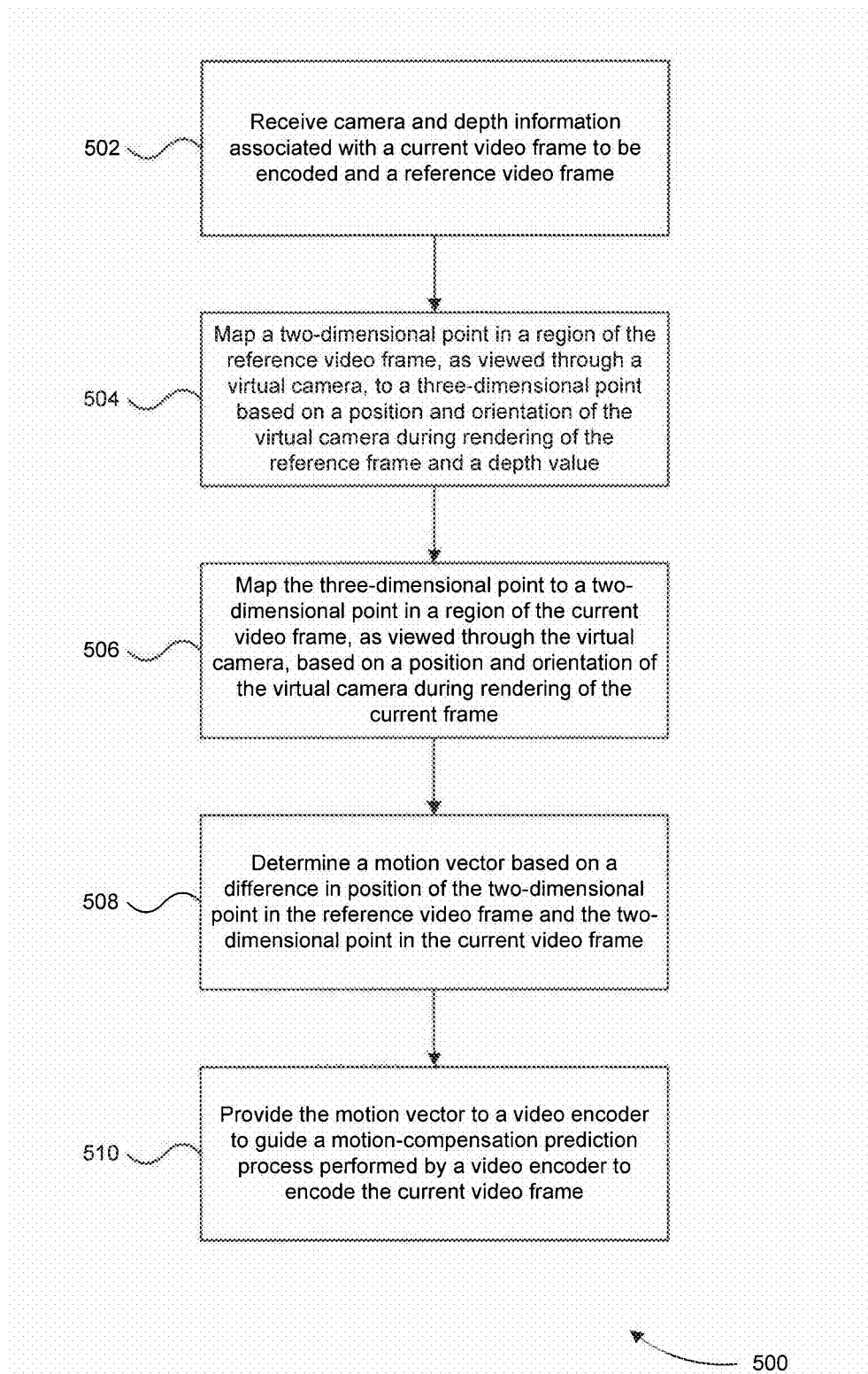
FIG. 5 illustrates a flowchart of a method for generating a motion vector to guide a motion-compensation prediction process performed by a video encoder in accordance with embodiments of the present disclosure.

Referring now to FIG. 5, a flowchart 500 of a method for generating a motion vector to guide a motion-compensation prediction process performed by a video encoder is illustrated in accordance with embodiments of the present disclosure. The method of flowchart 500 can be implemented by camera and depth information analyzer 302 as described above in reference to FIGS. 3 and 4. However, it should be noted that the method can be implemented by other systems and components as well. It should be further noted that some of the steps of flowchart 500 do not have to occur in the order shown in FIG. 5.

The method of flowchart 500 begins at step 502. At step 502, camera and depth information associated with a current video frame to be encoded and a reference video frame are received.

After step 502, flowchart 500 proceeds to step 504. At step 504, a two-dimensional point (i.e., a pixel) in a region of the reference video frame, as viewed through a virtual camera, is mapped to a three-dimensional point based on a depth value associated with the two-dimensional point and based on a position and orientation of the virtual camera during rendering of the reference frame. In one embodiment, the two-dimensional point is selected as the barycenter of the reference video frame and the depth value is set as the average depth value of the two-dimensional points (i.e., pixels) in the image region of the reference video frame. In one embodiment, the depth values of the two-dimensional points in the image region of the reference video correspond to the distance of the objects they depict from the virtual camera used to render them.

After step 504, flowchart 500 proceeds to step 506. At step 506, the three-dimensional point is mapped to a two-dimensional point in the current video frame, as viewed through the virtual camera, based on a position and orientation of the virtual camera during rendering of the current frame.

After step 506, flowchart 500 proceeds to step 508. At step 508, a motion vector is determined based on a difference in position of the two-dimensional point in the reference video frame and the two-dimensional point in the current video frame.

After step 508, flowchart 500 proceeds to step 510. At step 510, the motion vector is provided to a video encoder to guide a motion-compensation prediction process performed by the video encoder to encode the current video frame. For example, the video encoder can use motion vector to position a search window in the reference video frame while performing motion-compensation prediction to more efficiently encode a block of pixels in the current video frame.

It should be noted that the embodiments of the system and method of the present disclosure described above with reference to FIGS. 3-5 can be used in a server operating in a cloud gaming service to improve, for example, the amount of latency, downstream bandwidth, and/or computational processing power associated with playing a video game over its service. The method and system of the present disclosure can be further used in other applications where camera and depth information of a rendered or captured video frame is available as would be appreciated by one of ordinary skill in the art based on the teachings herein. For example, the method and system of the present disclosure can be used in a video conferencing application that uses a depth camera to capture video frames.

4. EXAMPLE COMPUTER SYSTEM IMPLEMENTATION

It will be apparent to persons skilled in the relevant art(s) that various elements and features of the present disclosure, as described herein, can be implemented in hardware using analog and/or digital circuits, in software, through the execution of instructions by one or more general purpose or special-purpose processors, or as a combination of hardware and software.

Figure 6:
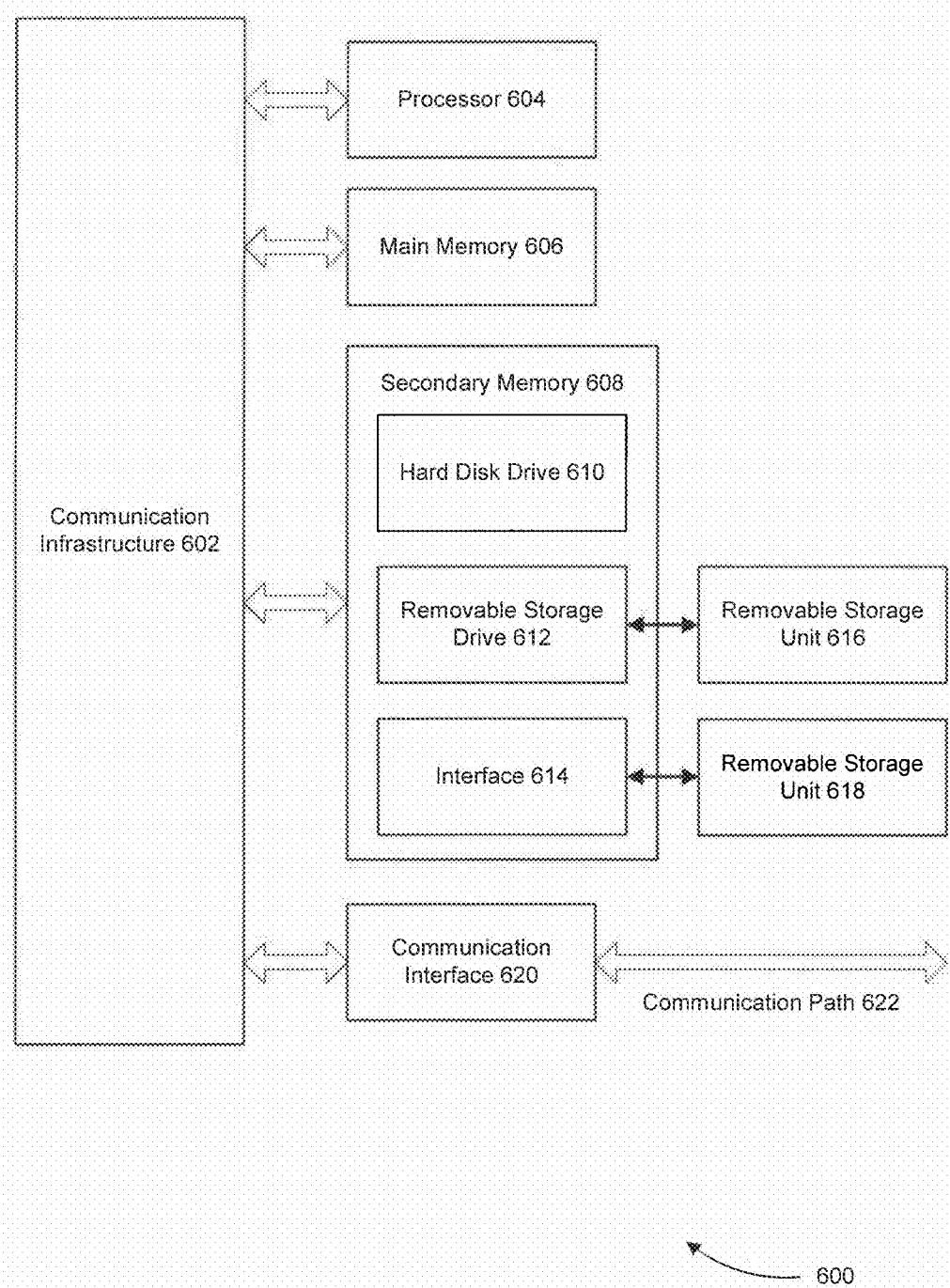
FIG. 6 illustrates a block diagram of an example computer system that can be used to implement aspects of the present disclosure.

The following description of a general purpose computer system is provided for the sake of completeness. Embodiments of the present disclosure can be implemented in hardware, or as a combination of software and hardware. Consequently, embodiments of the disclosure may be implemented in the environment of a computer system or other processing system. An example of such a computer system 600 is shown in FIG. 6. All of the modules depicted in FIGS. 1 and 3 can execute on one or more distinct computer systems 600. Furthermore, each of the steps of the flowchart depicted in FIG. 5 can be implemented on one or more distinct computer systems 600.

Computer system 600 includes one or more processors, such as processor 604. Processor 604 can be a special purpose or a general purpose digital signal processor. Processor 604 is connected to a communication infrastructure 602 (for example, a bus or network). Various software implementations are described in terms of this exemplary computer system. After reading this description, it will become apparent to a person skilled in the relevant art(s) how to implement the disclosed embodiments using other computer systems and/or computer architectures.

Computer system 600 also includes a main memory 606, preferably random access memory (RAM), and may also include a secondary memory 608. Secondary memory 608 may include, for example, a hard disk drive 610 and/or a removable storage drive 612, representing a floppy disk drive, a magnetic tape drive, an optical disk drive, or the like. Removable storage drive 1212 reads from and/or writes to a removable storage unit 616 in a well-known manner. Removable storage unit 616 represents a floppy disk, magnetic tape, optical disk, or the like, which is read by and written to by removable storage drive 612. As will be appreciated by persons skilled in the relevant art(s), removable storage unit 616 includes a computer usable storage medium having stored therein computer software and/or data.

In alternative implementations, secondary memory 608 may include other similar means for allowing computer programs or other instructions to be loaded into computer system 600. Such means may include, for example, a removable storage unit 618 and an interface 614. Examples of such means may include a program cartridge and cartridge interface (such as that found in video game devices), a removable memory chip (such as an EPROM, or PROM) and associated socket, a thumb drive and USB port, and other removable storage units 618 and interfaces 614 which allow software and data to be transferred from removable storage unit 618 to computer system 600.

Computer system 600 may also include a communications interface 620. Communications interface 620 allows software and data to be transferred between computer system 600 and external devices. Examples of communications interface 620 may include a modem, a network interface (such as an Ethernet card), a communications port, a PCMCIA slot and card, etc. Software and data transferred via communications interface 620 are in the form of signals which may be electronic, electromagnetic, optical, or other signals capable of being received by communications interface 620. These signals are provided to communications interface 620 via a communications path 622. Communications path 622 carries signals and may be implemented using wire or cable, fiber optics, a phone line, a cellular phone link, an RF link and other communications channels.

As used herein, the terms "computer program medium" and "computer readable medium" are used to generally refer to tangible storage media such as removable storage units 616 and 618 or a hard disk installed in hard disk drive 610. These computer program products are means for providing software to computer system 600.

Computer programs (also called computer control logic) are stored in main memory 606 and/or secondary memory 608. Computer programs may also be received via communications interface 620. Such computer programs, when executed, enable the computer system 600 to implement the present disclosure as discussed herein. In particular, the computer programs, when executed, enable processor 604 to implement the processes of the present disclosure, such as any of the methods described herein. Accordingly, such computer programs represent controllers of the computer system 600. Where the disclosed embodiments are implemented using software, the software may be stored in a computer program product and loaded into computer system 600 using removable storage drive 612, interface 614, or communications interface 620.

In another embodiment, features of the disclosure are implemented primarily in hardware using, for example, hardware components such as application-specific integrated circuits (ASICs) and gate arrays. Implementation of a hardware state machine so as to perform the functions described herein will also be apparent to persons skilled in the relevant art(s).

5. CONCLUSION

The present disclosure has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

What is claimed is:

1. A method comprising:
processing a chronological sequence of rendered video frames to generate virtual camera information and a depth associated with the sequence of rendered video frames by mapping a two-dimensional point in a region of a first rendered video frame, as viewed through a virtual camera, to a three-dimensional point based on a position and orientation of the virtual camera during rendering of the first video frame and the depth, wherein the virtual camera information indicates a position of the virtual camera and the depth indicates a distance from the virtual camera;
performing motion-compensation prediction based on the generated virtual camera information and depth to determine a motion vector based on a difference in position of a two-dimensional point in the sequence of rendered video frames; and
determining a size of a search window or a size of a search range within the search window based on the depth.

2. The method of claim 1, further comprising generating the virtual camera and depth information by:
mapping the three-dimensional point to a two-dimensional point in a region of a second rendered video frame, as viewed through the camera, based on a position and orientation of the camera during rendering of the second rendered video frame; and
determining a motion vector based on a difference in position of the two-dimensional point in the first rendered video frame and the two-dimensional point in the second rendered video frame.

3. The method of claim 2, further comprising determining a position for the search window in the first video frame for encoding a block of pixels in the region of the second video frame based on the motion vector.

4. The method of claim 3, further comprising searching for a block of pixels within the search range in the search window based on the block of pixels in the region of the second video frame.

5. The method of claim 2, further comprising:
selecting the two-dimensional point in the region of the first video frame based on a barycenter of the region of the first video frame.

6. The method of claim 2, further comprising:
determining the depth value as an average depth of pixels in the region of the first video frame from the virtual camera during rendering of the first video frame or as a depth of the three-dimensional point from the virtual camera during rendering of the first video frame.

7. The method of claim 2, wherein the first video frame and the second video frame are consecutive video frames in a sequence of video frames.

8. The method of claim 1, further comprising generating the virtual camera and depth information by:
determining quantization parameters to quantize residuals of encoded blocks of pixels in a first video frame based on the depth information.

9. The method of claim 8, wherein the quantization parameters are determined to have smaller values for encoded blocks of pixels in the first video frame that, on average, depict objects closer to a camera used to render the first video frame than encoded blocks of pixels in the first video frame that, on average, depict objects farther away from the camera.

10. A computer-readable storage device having instructions recorded thereon, execution of which, by a processing device, causes the processing device to:
process, by a 3D rendering API of the processing device, a chronological sequence of rendered video frames to generate virtual camera information and a depth associated with the sequence of rendered video frames by mapping a two-dimensional point in a region of a first rendered video frame, as viewed through a virtual camera, to a three-dimensional point based on a position and orientation of the virtual camera during rendering of the first video frame and the depth, wherein the virtual camera information indicates a position of the virtual camera and the depth indicates a distance from the virtual camera;
perform, by a video encoder of the processing device, motion-compensation prediction based on the generated virtual camera information and depth to determine a motion vector based on a difference in position of a two-dimensional point in the sequence of rendered video frames; and
determine, by the video encoder, a size of a search window or a size of a search range within the search window based on the depth.

11. The computer-readable storage device of claim 10, further comprising instructions recorded thereon, execution of which, by a processing device, causes the processing to generate the virtual camera information and depth by:
mapping, by the camera and depth information analyzer, the three-dimensional point to a two-dimensional point in a region of a second rendered video frame, as viewed through the camera, based on a position and orientation of the camera during rendering of the second rendered video frame; and
determining, by the video encoder, a motion vector based on a difference in position of the two-dimensional point in the first rendered video frame and the two-dimensional point in the second rendered video frame.

12. The computer-readable storage device of claim 10, further comprising instructions recorded thereon, execution of which, by a processing device, causes the video encoder to:
quantize residuals of encoded blocks of pixels in a first video frame based on the depth.

13. A method comprising:
mapping a two-dimensional point in a region of a first rendered video frame, as viewed through a virtual camera, to a three-dimensional point based on a position and orientation of the virtual camera during rendering of the first video frame and a depth value, wherein the depth indicates a distance from the virtual camera;
mapping the three-dimensional point to a two-dimensional point in a region of a second rendered video frame, as viewed through the virtual camera, based on a position and orientation of the virtual camera during rendering of a second video frame;
determining a motion vector based on a difference in position of the two-dimensional point in the first rendered video frame and the two-dimensional point in the second rendered video frame;
providing the motion vector to a video encoder to guide a motion compensation prediction process performed by the video encoder; and
determining a size of a search window or a size of a search range within the search window based on a depth associated with the first rendered video frame and the second rendered video frame.

14. The method of claim 13, wherein the video encoder uses the motion vector to determine a position for the search window in the first rendered video frame to use to encode a block of pixels in the region of the second rendered video frame.

15. The method of claim 14, wherein the video encoder searches for a block of pixels within the search range in the search window based on the block pixels in the region of the second video frame.

16. The method of claim 13, wherein the first video frame and the second video frame are consecutive video frames in a sequence of video frames.

17. The method of claim 13, further comprising generating a virtual camera and depth information based on the camera and depth information associated with the first and second video frames by
determining quantization parameters to quantize residuals of encoded blocks of pixels in the first video frame based on the depth information.

18. An apparatus comprising:
circuitry configured to process a chronological sequence of rendered video frames to generate virtual camera information and a depth associated with the sequence of rendered video frames by mapping a two-dimensional point in a region of a first rendered video frame, as viewed through a virtual camera, to a three-dimensional point based on a position and orientation of the virtual camera during rendering of the first video frame and the depth, wherein the virtual camera information indicates a position of the virtual camera and the depth indicates a distance from the virtual camera;
circuitry configured to perform motion-compensation prediction based on the generated virtual camera information and depth to determine a motion vector based on a difference in position of a two-dimensional point in the sequence of rendered video frames; and
circuitry configured to determine a size of a search window or a size of a search range within the search window.

19. A system comprising:
an end-user device; and
a server comprising:
circuitry configured to process a chronological sequence of rendered video frames to generate virtual camera information and a depth associated with the sequence of rendered video frames by mapping a two-dimensional point in a region of a first rendered video frame, as viewed through a virtual camera, to a three-dimensional point based on a position and orientation of the virtual camera during rendering of the first video frame and the depth, wherein the virtual camera information indicates a position of the virtual camera and the depth indicates a distance from the virtual camera; and
circuitry configured to perform motion-compensation prediction based on the generated virtual camera information and depth to determine a motion vector based on a difference in position of a two-dimensional point in the sequence of rendered video; and
circuitry configured to determine a size of a search window or a size of a search range within the search window based on the depth.

20. The system of claim 19, wherein the virtual camera and depth are generated at least by mapping a two-dimensional point in a region of a first rendered video frame, as viewed through a camera, to a three-dimensional point based on a position and orientation of the camera during rendering of the first rendered video frame and a depth value.

21. The system of claim 20, wherein the virtual camera information and depth are generated at least by mapping the three-dimensional point to a two-dimensional point in a region of a second rendered video frame, as viewed through the camera, based on a position and orientation of the camera during rendering of the second rendered video frame.

22. The system of claim 21, wherein the virtual camera information and depth are generated at least by determining a motion vector based on a difference in position of the two-dimensional point in the first video frame and the two-dimensional point in the second rendered video frame.

* * * * *